(12) United States Patent
Peh

(10) Patent No.: US 7,275,052 B2
(45) Date of Patent: Sep. 25, 2007

(54) COMBINED CLASSIFICATION BASED ON EXAMPLES, QUERIES, AND KEYWORDS

(75) Inventor: Thomas Peh, Heidelberg (DE)

(73) Assignee: SAP AG, Walldorf (DE)

( * ) Notice: Subject to any disclaimer, the term of this patent is extended or adjusted under 35 U.S.C. 154(b) by 456 days.

(21) Appl. No.: 10/923,553

(22) Filed: Aug. 20, 2004

(65) Prior Publication Data

US 2006/0041604 A1    Feb. 23, 2006

(51) Int. Cl.
   *G06F 7/00* (2006.01)
   *G06F 17/30* (2006.01)
(52) U.S. Cl. ............................................. 707/2; 707/5
(58) Field of Classification Search ............ 707/2, 707/7, 102, 205, 3, 5; 704/10; 706/12
   See application file for complete search history.

(56) References Cited

U.S. PATENT DOCUMENTS

| | | | |
|---|---|---|---|
| 6,137,911 A * | 10/2000 | Zhilyaev | 382/225 |
| 6,571,225 B1 * | 5/2003 | Oles et al. | 706/12 |
| 6,947,930 B2 * | 9/2005 | Anick et al. | 707/5 |
| 7,065,514 B2 * | 6/2006 | Yang-Stephens et al. | 707/2 |
| 2005/0228774 A1 * | 10/2005 | Ronnewinkel | 707/2 |

OTHER PUBLICATIONS

Raymond J. Mooney and Loriene Roy (2000), Content-Based Book Recommending Using Learning for Text Categorization, pp. 195-204.*

Thorsten Joachims (2002), Optimizing Search Engines using Clickthrough Data, pp. 133-142.*

\* cited by examiner

*Primary Examiner*—Don Wong
*Assistant Examiner*—Merilyn Nguyen
(74) *Attorney, Agent, or Firm*—Mintz, Levin, Cohn, Ferri, Glovsky & Popeo, P.C.

(57) ABSTRACT

A document classification module may include a classification module that enables a user to classify documents using a combination of example-based classification (EBC) and query-based classification (QBC) methods. The user may also enter keywords with positive, negative, or null weights to fine tune the results of the classification process.

10 Claims, 6 Drawing Sheets

COMBINED CLASSIFICATION BASED ON EXAMPLES, QUERIES, AND KEYWORDS

BACKGROUND

The present application describes systems and techniques relating to information retrieval (IR) techniques, for example, taxonomy generation for document classification.

Searching information in a large collection of documents is often time-consuming. To increase the speed of the search, the document collection may be organized in a structural way, e.g., in clusters where documents of similar topics are stored together. Taxonomy generation deals with categorizing and labeling documents to satisfy a user's need for efficient document searching and retrieval.

A taxonomy is a set or hierarchy of categories that contains thematically similar objects. Examples of taxonomies include, e.g., genera and species in biology, and galaxies and stars in astronomy. In such taxonomies, the classification is based on clearly distinct properties such as shape or size. However, such classification criteria may not be suitable for taxonomies for document collections because different authors may use different words to express or describe the same themes.

Data and/or text mining methods may be used for the automatic classification of documents. An automatic classification system automatically assigns a document to a best matching class, i.e., a class in which the documents already assigned to it are more related to the "new" document being classified than any other document taken from another class. Typically the documents are standardized by segmenting the documents into individual words or phrases (i.e., "terms"). The documents are represented as term vectors in a term-vector space. The terms are the components (or coordinates) of the document (or its corresponding term vector). Each component of a term vector represents the frequency of one of the terms in the document, i.e., the term frequency (TF). The components of the term vector may be normalized using suitable statistical information.

Two documents may be considered similar if the angle between their corresponding term vectors is small, or equivalent, the cosine of the angle between the vectors is large. The cosine of the angle may be calculated from the normalized scalar product of the vectors. The larger the value of a component of a term vector, the more important is the corresponding term in the document and thus the higher its influence in the scalar product for calculating the similarity of two documents.

Methods such as K nearest neighbor (KNN), Rocchio, Bayes, and support vector machines (SVM) may be used in text mining systems for automatic classification of documents. These methods use a given allocation of example documents ("training documents") to existing categories to calculate rules for classifying new documents. The training documents have a verified assignment to one (or more) classes and that the classification rule is calculated via the method which makes use of the term vector representation of these documents and their class assignments.

SUMMARY

A document classification module may include a classification module that enables a user to classify documents using a combination of example-based classification (EBC) and query-based classification (QBC) methods. The user may also enter keywords with positive, negative, or null weights to fine tune the results of the classification process.

The classification module may identify terms in a document to be classified and generate class candidates for the document based on a query. The classification module may assign a first rank to each of the class candidates based on positive-weight, negative-weight, and/or null-weight keyword associated with the class candidates and assign the document to one of the class candidates. The classification module may rank the class by setting a vector space component corresponding to a null-weight keyword to zero The user may assign training documents to classes. The classification module may assign a second rank to class candidates based on the training documents associated with the class candidates.

The classification module may calculate a mean rank from the first rank and the second rank associated with each the class candidates, and assign the document to the class candidates based on the mean rank.

BRIEF DESCRIPTION OF THE DRAWINGS

Like reference symbols in the various drawings indicate like elements.

DETAILED DESCRIPTION

Figure 1:
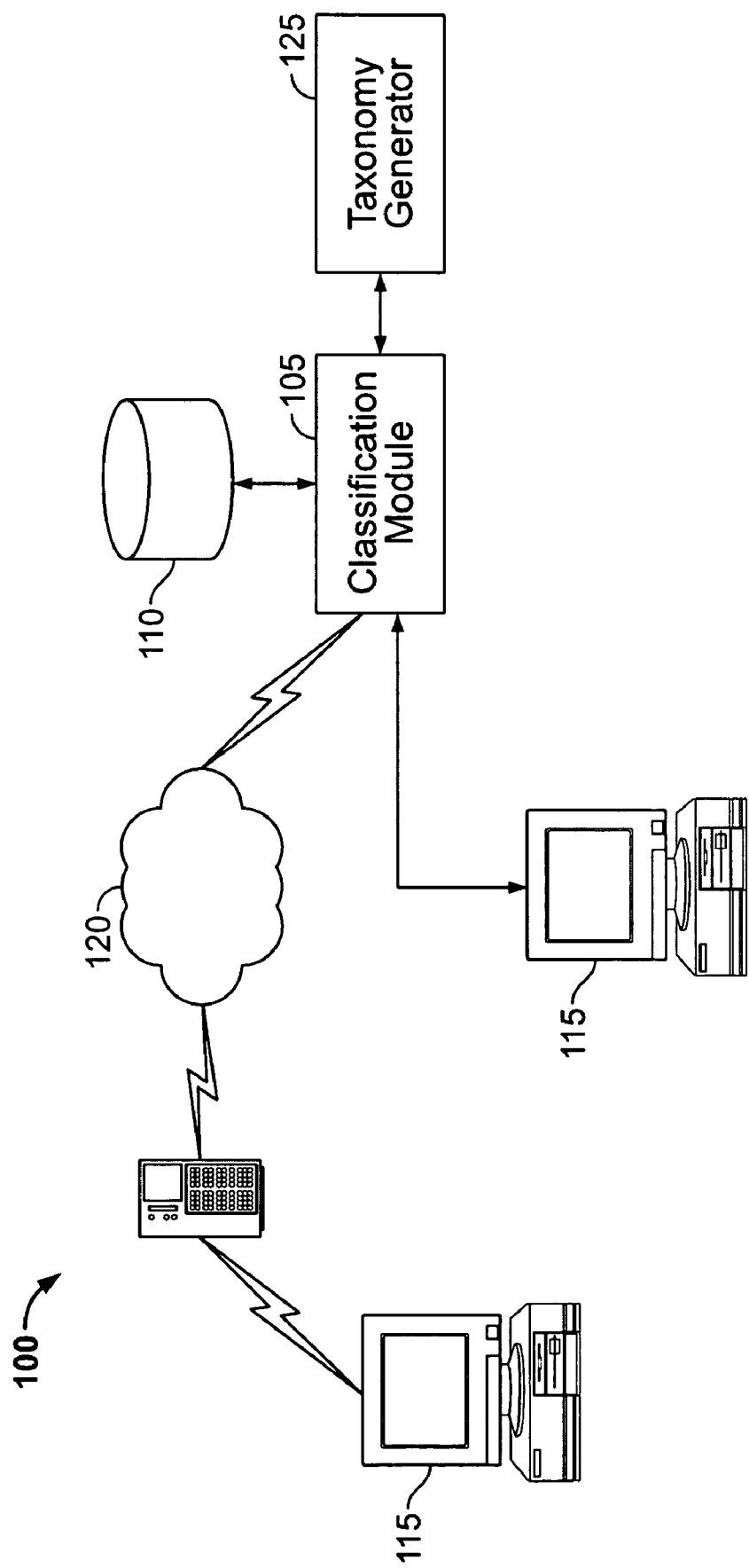
FIG. 1 shows a block diagram of a document classification system according to an embodiment.

FIG. 1 shows a document classification system 100 according to an embodiment. The system 100 includes a classification module 105 to classify documents in a source 110 of electronic documents, e.g., one or more servers or databases. The classification module may also classify new documents as they are added to the source 110. A user may access the classification module 105 using a client computer 115 via a communication link, e.g., a direct connection or a connection through a network 120.

The classification module may utilize a taxonomy generator 125 to organize the classification results into a hierarchy of documents. The taxonomy generator may also suggest potential taxonomy terms to the user. The taxonomy generator 125 may be, for example, a software program stored on a storage device and run by the classification module 110 or by a programmable processor.

The classification module may enable a user to classify documents using various classification techniques. These classification techniques may include example-based classification (EBC) and query-based classification (QBC) methods.

EBC methods may utilize example (or "training") documents to classify documents. EBC methods provide results for a new document as a list of suggested categories, each with a rank value, where a higher rank indicates a more appropriate category. EBC methods make use of the scalar product in the underlying term vector space to calculate certain rules.

Two documents may be considered similar when the angle between their term vectors is small, that is, the cosine of the angle between the two term vectors in the term-vector space is large. The cosine of the angle may be calculated from the normalized scalar product of the vectors. The larger the value of a component of a term vector, the more important is the corresponding term in the document and thus the higher its influence in the scalar product for calculating the similarity of two documents.

A potential disadvantage of EBC methods is that suitable training documents may be difficult to discover. For some classes, there are few or no training documents. Also, since documents often deal with more than one theme, documents may be used as training documents for several classes. Any class to which such documents are allocated is distorted by the terms of the other classes, and the classes tend to become indistinct. Also, since pure EBC methods are based on the contents of the document, other potentially informative document properties like file size, author, and file format are not considered.

QBC methods utilize rules for automatic classification. For each category, a set of rules, called queries, are specified. Queries may be entered as a string of terms and, optionally, logical operators, such as Boolean and proximity operators. Given a new document, if the set of rules for a category are all satisfied (i.e., returns "yes" or "true") the document is allocated to that category, otherwise, it is not. The rules may related to document contents or to document properties, such as file format and/or size. QBC methods provide results for a new document as a list of those categories for which all rules are fulfilled. Ranks are not calculated (or in effect are all preset to one).

Some disadvantages of QBC methods are that any documents that have already been allocated to classes are no longer considered in subsequent classification operations. Furthermore, queries are rigid and restrictive, since a document is excluded if the set of rules is not completely fulfilled. Also, if several classes are returned as results, there is no way to say which is better, since all returned categories have the same rank.

In an embodiment, the taxonomy generator may utilize an automatic document classification technique that utilizes aspects of both EBC and QBC. The taxonomy builder may enable a user to fine-tune a classification by taking explicit account of any terms that are unwanted or missing in the documents to be classified.

Figure 2:
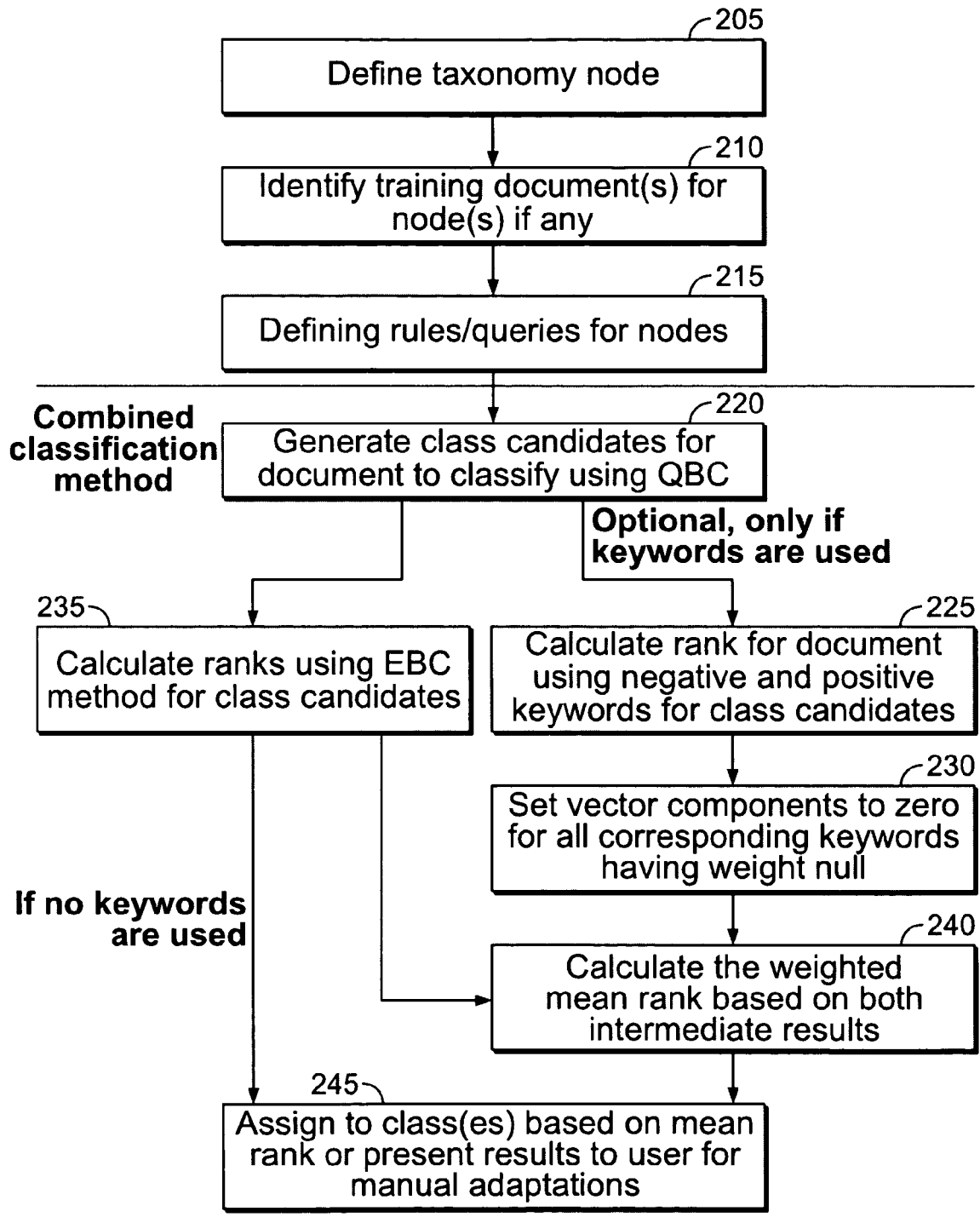
FIG. 2 is a flowchart showing a process for classifying documents in collection using a combined example-based classification (EBC)/query-based classification (QBC) method according to an embodiment.

FIG. 2 is a flowchart describing a combined QBC/EBC method 200 according to an embodiment. The user may be presented with a graphical user tool for building a taxonomy, such as that shown in FIG. 3. Documents may be classified in categories arranged in a taxonomy represented by a hierarchical tree structure. In this example, the taxonomy may include a parent taxonomy node 302 (labeled "news") with two main branches for the categories "cars" 304 and "sport" 306. The "cars" branch includes the children nodes "Volkswagen" 308 and "VW Golf" 310. The "sports" branch includes a child node, "golf". The user may define taxonomy nodes using a pop-up utility 312 in which the user can name and define the node (block 205). The user may also assign training documents to a node, which may be used in an EBC portion of the method (block 210). The training documents may be entered manually, using documents the user considers representative of the category, or automatically, e.g., using a search engine such as Google™.

When defining the taxonomy node, the user may define rules, e.g., a query including terms and logical operators, in a QBC area 320 of the pop-up. The classification module may generate class candidates (from the taxonomy nodes) for a document to be classified using a QBC method based on the query in the QBC area of the taxonomy nodes (block 215). Since a QBC method is used, all of the class candidates initially have the same rank.

When defining the taxonomy node, the user may also specify unwanted or missing terms by entering keywords 322 in an EBC area 324 of the pop-up. Keywords may be assigned a positive weight, a negative weight, or a null weight. Keywords with positive weight describe wanted terms that may be missing in the training documents or terms determined to have too little weight there. Keywords with negative weight describe unwanted terms that are either found in the training documents, and hence need to be excluded, or terms expected to be in some future incorrectly classified documents. Keywords with negative weight may be used for "misleading" terms, which might dominate the user's classification rule if they have a high weight. Keywords with null weight may be terms determined to have no particular relevance to the contents of the class and should be ignored. For example, consider a situation in which several new documents are added to a node as training documents and the user finds irrelevant documents being allocated to the class because they come from a given author (whose name is taken up automatically as a keyword since it appears in each document). To prevent this, the user may define the name of the author as a keyword with null weight.

The classification module may rank class candidates based on the negative and positive keywords defined for the class candidates (block 225). The vector space components in the training documents corresponding to null keywords may be set to zero (block 230). The class candidates may then be ranked using an EBC method (block 235). Assigning the vector space components corresponding to null keywords zero a weight reduces the rank of the category and thus the influence of the terms corresponding to the null keywords in the final ranking.

To illustrate this point, consider an example using a K-nearest neighbor (KNN) classification method. The KNN method may be used to classify a new document D. The user may establish a set of especially similar documents (e.g., training documents) {D1, . . . , Dn} with similarity values {S1, . . . , Sn}, where Si is the cosine of the angle between D and Di. Each of the documents Di is an example document and thus allocated to one or more categories Cj. These categories may be listed in rank order, where the rank of a category is the sum of the similarities Si to the new document D of all the documents Di that are allocated to that category.

TABLE 1

| Similarity (Si) | Documents (Di) | Class candidates (Cj) |
| --- | --- | --- |
| 0.4 | D1 | C1, C2 |
| 0.5 | D2 | C2 |
| 0.6 | D3 | C1 |

As shown in Table 1, the three most similar documents to a query document D, D1, D2, and D3, are determined to have similarity values 0.4, 0.5, and 0.6, respectively. In this example, training document Di has been allocated by the user to categories C1 and C2, training document D2 has been allocated to C2, and training document D2 has been allocated to C1. Based on these similarity values, the rank of category C1 is 0.4 (D1)+0.6 (D3)=1.0 and rank of category C2 is 0.4 (D1)+0.5 (D2)=0.9. In this case, document D may be automatically allocated to category C1 based on the higher ranking.

If a keyword for a node is defined to have zero weight, its vector space coordinate is subtracted from the scalar product used to calculate the similarity between the example documents for the node and the query document, and thus reduces the rank of the node.

TABLE 2

| Similarity (Si) | Documents (Di) | Class candidates (Cj) |
|---|---|---|
| 0.4 | D1 | C1, C2 |
| 0.5 | D2 | C2 |
| 0.4 | D3 | C1 |

For example, the ranking of category C1 may be reduced if the user defines a keyword that appears both in the document D to be classified and in document D3 with null weight. This reduces the similarity S3 between D and D3 from its previous value of 0.6 to a new value of 0.4 (as shown in Table 2), which in turn reduces the rank of category C1 from 1.0 to 0.8. Consequently, C2 is now the higher ranked category.

In a separate ranking operation, the class candidates may then be ranked using an EBC method (block 235). After factoring in the effect of any negative, positive, and null keywords, the classification module may then determine a mean rank for each class candidate (block 240) and assign the document to the taxonomy node with the highest mean rank or present the results to the user for manual adaptations (block 245).

Figure 3:
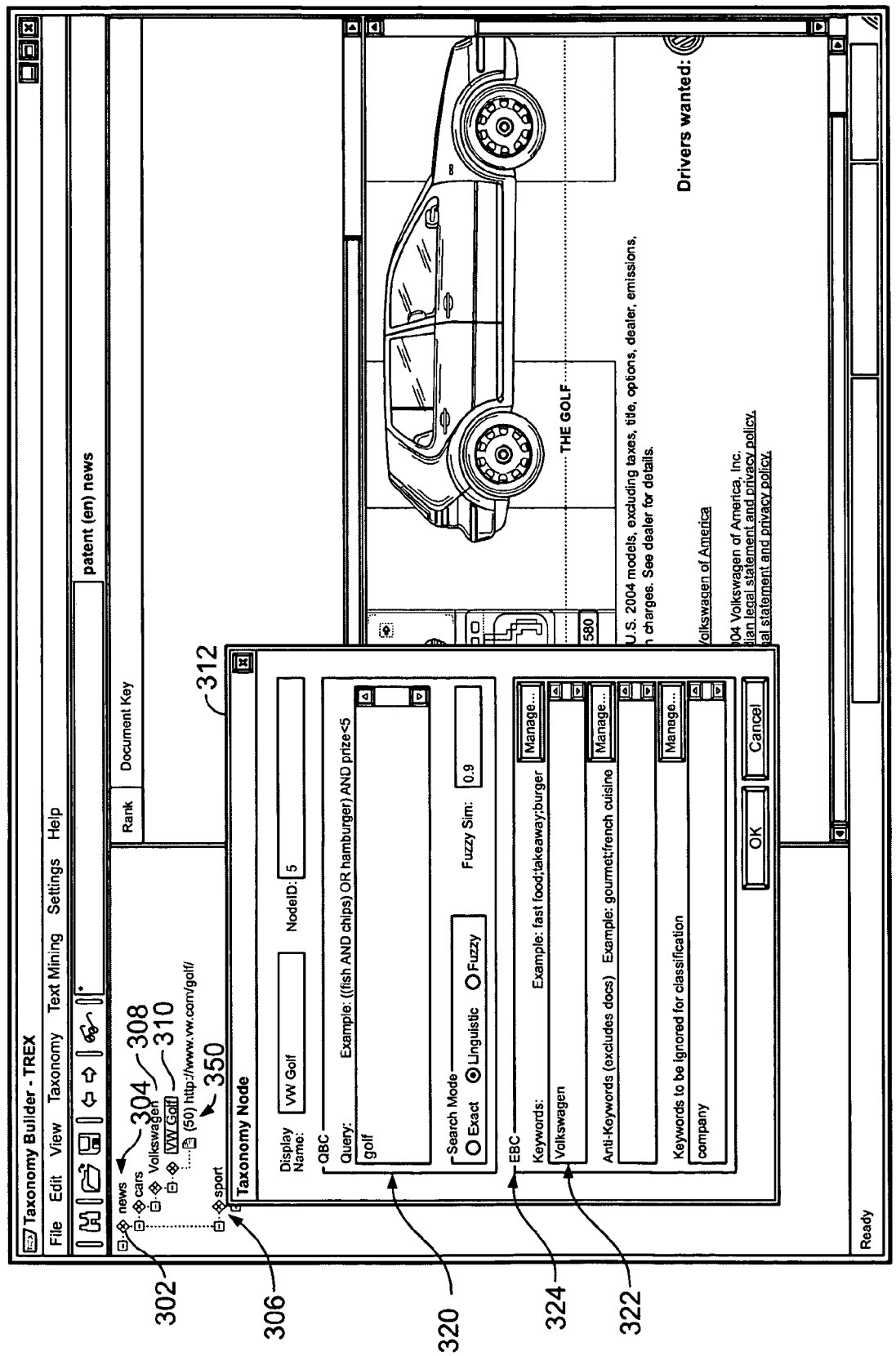
FIG. 3 is a screen shot showing a graphical user tool being used for a classification operation.

As shown in FIG. 3, the classified document may be placed under the taxonomy node with its mean rank 350. In this case, the ranks based on the positive keyword and the EBC are weighted equally. Here, the document http://www.vw.com/golf/ has a rank of 50 (%) because it contains the positive key word "Volkswagen" (100% for positive keyword rank) and no training documents for the EBC method (0% for EBC), giving a mean rank of 50%.

Figure 4:
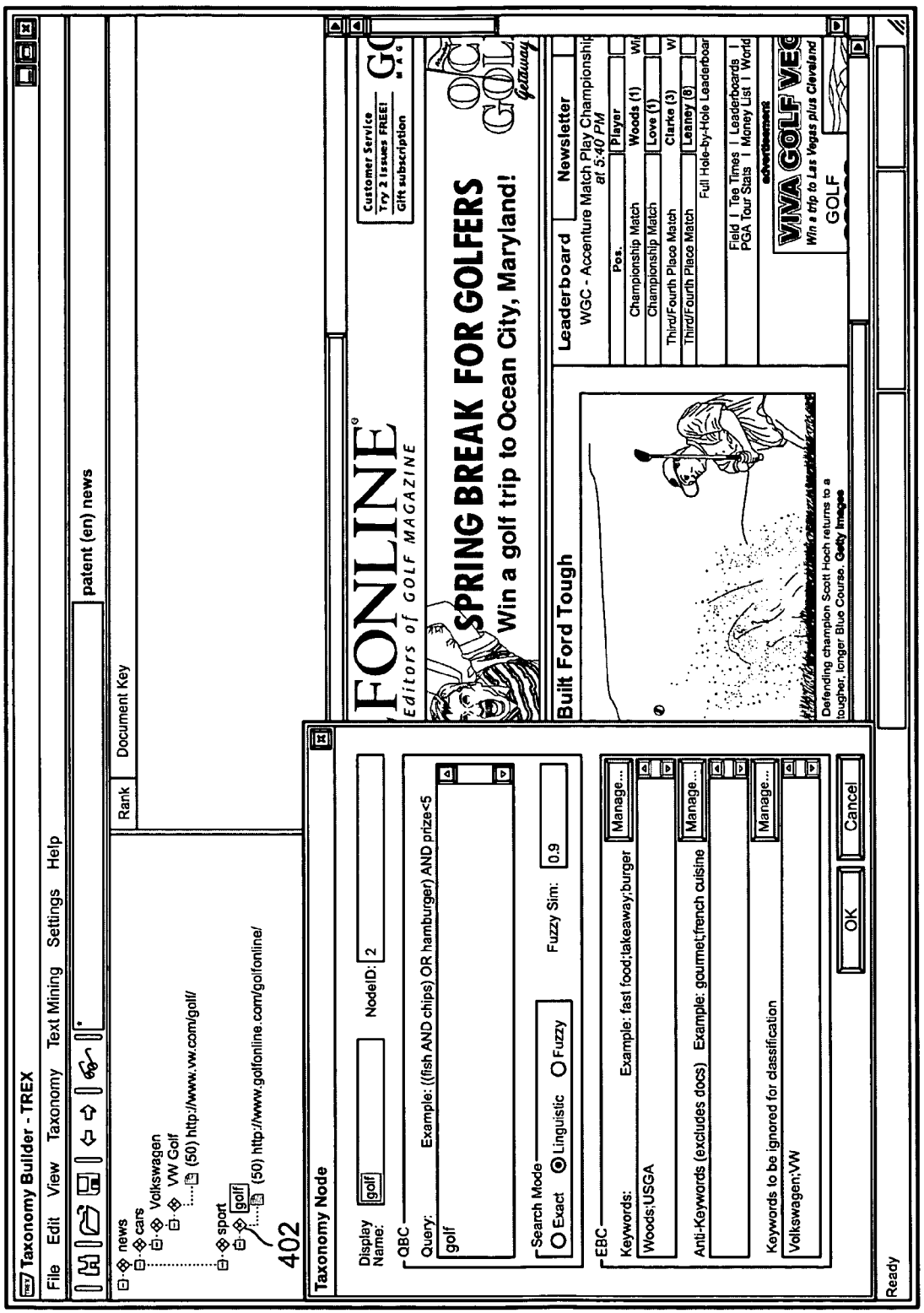
FIG. 4 is a screen shot showing the graphical user tool being used for another classification operation.

FIG. 4 shows a results for another document that is directed to a golf tournament. Here, the document is correctly classified under the "golf" taxonomy node 402 based on it query term and keywords (there are no training documents). It should be noted that if the document of FIG. 3 (http://www.vw.com/golf/) was first presented to the "golf" node using only the QBC query, it would have been incorrectly classified under this taxonomy node since it satisfies the query "golf" defined for that node.

Figure 5:
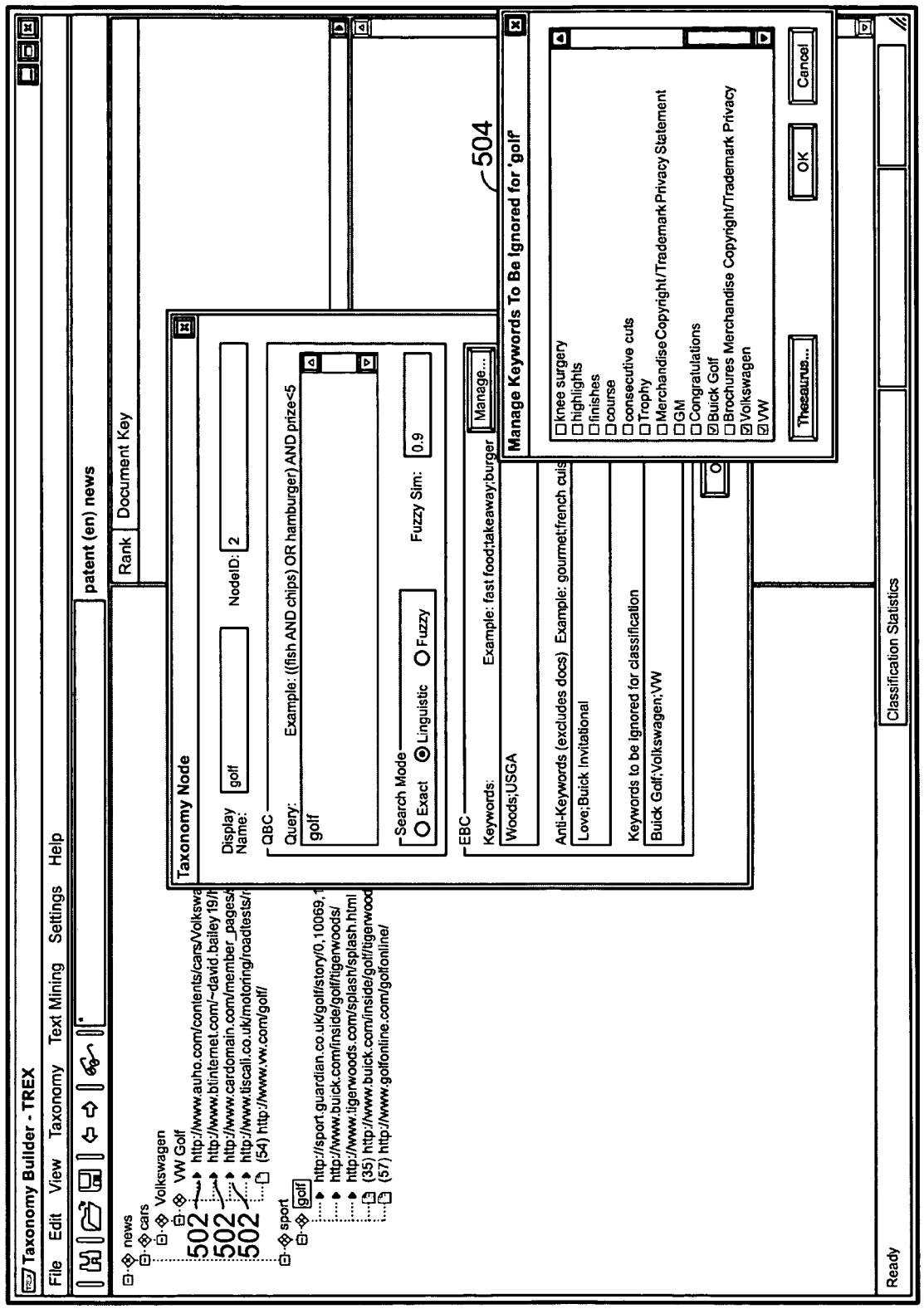
FIG. 5 is a screen shot showing the graphical user tool being used for a classification operation utilizing training documents.

FIG. 5 illustrates classification results utilizing training documents 502 (indicated by "▶") in conjunction with query and keywords. The taxonomy generator may also provide a pop-up 504 for managing keywords, including lists for positive, negative, and null keywords. The list of keywords may be generated automatically from keywords used in other nodes or from words in the training documents.

Figure 6:
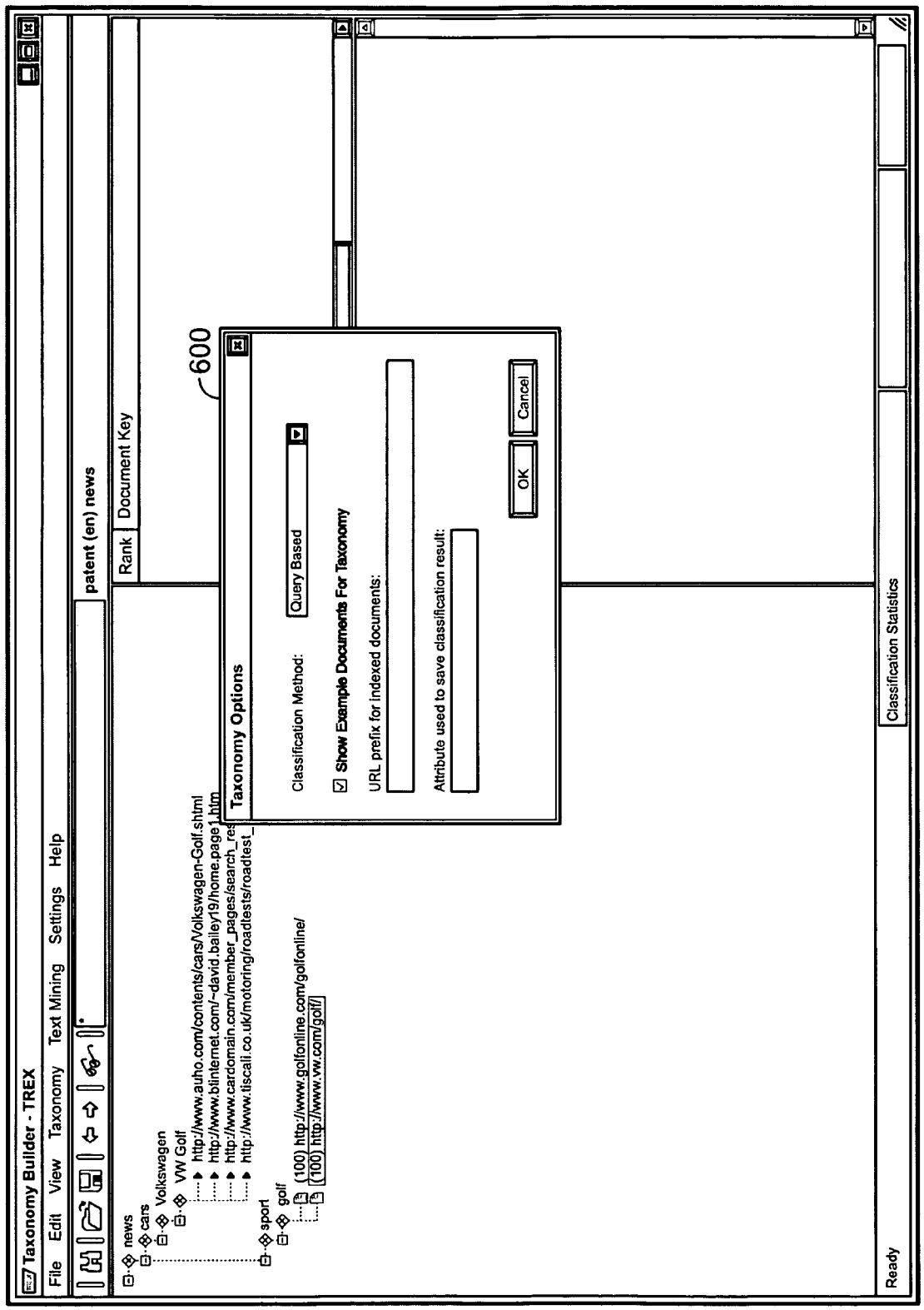
FIG. 6 is a screen shot showing the graphical user tool being used for a QBC operation.

In an embodiment, the user may be presented a pup up 600 enabling the user to select which classification to use for a given node, as shown in FIG. 6. The user may select from pure QBC, pure EBC, or the combined QBC/EBC method described above.

These computer programs (also known as programs, software, software applications, or code) may include machine instructions for a programmable processor, and can be implemented in a high-level procedural and/or object-oriented programming language, and/or in assembly/machine language. As used herein, the term "machine-readable medium" refers to any computer program product, apparatus, and/or device (e.g., magnetic discs, optical disks, memory, Programmable Logic Devices (PLDs)) used to provide machine instructions and/or data to a programmable processor.

As used herein, the terms "electronic document" and "document" represent a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

A number of embodiments have been described. Nevertheless, it will be understood that various modifications may be made without departing from the spirit and scope of the invention. For example, all taxonomy nodes, not just the terminal nodes, may be considered as class candidates. Also, blocks in the flowcharts may be skipped or performed out of order and still produce desirable results. Accordingly, other embodiments are within the scope of the following claims.

The invention claimed is:

1. A computer-implemented method comprising:
   identifying terms in a document to be classified;
   generating, based on the identified terms, one or more class candidates for the document from a plurality of classes based on a query;
   assigning a first rank to each of the class candidates based on at least one of a positive-weight, negative-weight, and null-weight keyword associated with the class candidates, the positive-weight representative of wanted terms in the class candidates, the negative-weight representative of unwanted terms in the class candidates, and the null-weight representative of terms to be ignored in the class candidates;
   assigning the document to one of the ranked class candidates; and
   providing the results of the assigning of the document to a computer for presentation.

2. The method of claim 1, further comprising:
   assigning one or more training documents to one or more of said plurality of classes.

3. The method of claim 2, further comprising:
   assigning a second rank to each of the class candidates based on one or more training documents associated with the remaining class candidates.

4. The method of claim 3, wherein assigning the second rank further comprises: ranking the class candidates based on the training documents by setting to zero a vector space component corresponding to a null-weight keyword.

5. The method of claim 3, further comprising:
   calculating a mean rank from the first rank, assigned based on the query, and the second rank, assigned based on one or more training documents, the mean rank calculated for each of the one or more class candidates; and
   assigning the document to one of the class candidates based on the mean rank.

6. A machine-readable medium including machine-executable instructions to cause a machine to:
   identify terms in a document to be classified;
   generate, based on the identified terms, one or more class candidates for the document from a plurality of classes based on a query;

assign a first rank to each of the class candidates based on at least one of a positive-weight, negative-weight, and null-weight keyword associated with said the class candidates, the positive-weight representative of wanted terms in the class candidates, the negative-weight representative of unwanted terms in the class candidates, and the null-weight representative of terms to be ignored in the class candidates;

assign the document to one of the ranked class candidates; and provide the results of the assigning of the document to a computer for presentation.

7. The machine-readable medium of claim 6, further comprising instructions to cause the machine to:

assign one or more training documents to one or more of said plurality of classes.

8. The machine-readable medium of claim 7, further comprising instructions to cause the machine to:

assign a second rank to each of the class candidates based on one or more training documents associated with the remaining class candidates.

9. The machine-readable medium of claim 8, wherein assigning the second rank further comprises: ranking the class candidates based on the training documents by setting to zero a vector space component corresponding to a null-weight keyword.

10. The machine-readable medium of claim 8, further comprising instructions to cause the machine to:

calculate a mean rank from the first rank, assigned based on the query, and the second rank, assigned based on one or more training documents, the mean rank calculated for each of the one or more class candidates; and assigning the document to one of the class candidates based on the mean rank.

* * * * *